United States Patent [19]

Froehlich

[11] Patent Number: 4,673,320
[45] Date of Patent: Jun. 16, 1987

[54] ANCHOR DOWEL ASSEMBLY

[75] Inventor: Peter Froehlich, Neuried, Fed. Rep. of Germany

[73] Assignee: Hilti Aktiengesellschaft, Fürstentum, Liechtenstein

[21] Appl. No.: 855,798

[22] Filed: Apr. 24, 1986

[30] Foreign Application Priority Data

Apr. 25, 1985 [DE] Fed. Rep. of Germany ....... 3514955

[51] Int. Cl.$^4$ ............................................. F16B 13/04
[52] U.S. Cl. ........................................ 411/21; 411/33; 411/39; 411/45; 411/30
[58] Field of Search .................... 411/21, 22, 23, 28, 411/29, 30, 32, 33, 39, 42, 44, 45, 59

[56] References Cited

U.S. PATENT DOCUMENTS

| 2,114,879 | 4/1938 | Hojnowski | 411/22 |
| 2,376,329 | 5/1945 | Causse | 411/23 |
| 3,014,399 | 12/1961 | Schaffner | 411/21 |
| 3,269,251 | 8/1966 | Bass | 411/21 |
| 3,312,138 | 4/1967 | Cumming | 411/21 |
| 3,897,035 | 7/1975 | Solo | 411/29 X |
| 4,014,243 | 3/1977 | Toomingas | . |
| 4,091,882 | 5/1978 | Hashimoto | 411/30 X |
| 4,402,637 | 9/1983 | Seghezzi | 411/39 X |
| 4,453,845 | 6/1984 | Donan | 411/21 X |
| 4,482,277 | 11/1984 | Schiefer | 411/39 X |
| 4,501,520 | 2/1985 | Bergner | 411/21 |
| 4,518,290 | 5/1985 | Fuchmann et al. | 411/30 |

FOREIGN PATENT DOCUMENTS

| 148882 | 3/1937 | Austria | 411/21 |
| 1885658 | 1/1964 | Fed. Rep. of Germany | 411/30 |
| 2535066 | 3/1977 | Fed. Rep. of Germany | . |
| 457981 | 8/1968 | Switzerland | 411/21 |

Primary Examiner—Thomas J. Holko
Attorney, Agent, or Firm—Toren, McGeady & Associates

[57] ABSTRACT

An anchor dowel assembly includes an axially elongated sleeve with window-like openings extending through its wall transversely of the axial direction. Locking members are positionable within the window-like openings for displacement radially outwardly from the sleeve for effecting the anchoring action. The locking members are displaced radially outwardly by an expansion tool driven between the locking members by a force directed in the axial direction of the sleeves.

4 Claims, 14 Drawing Figures

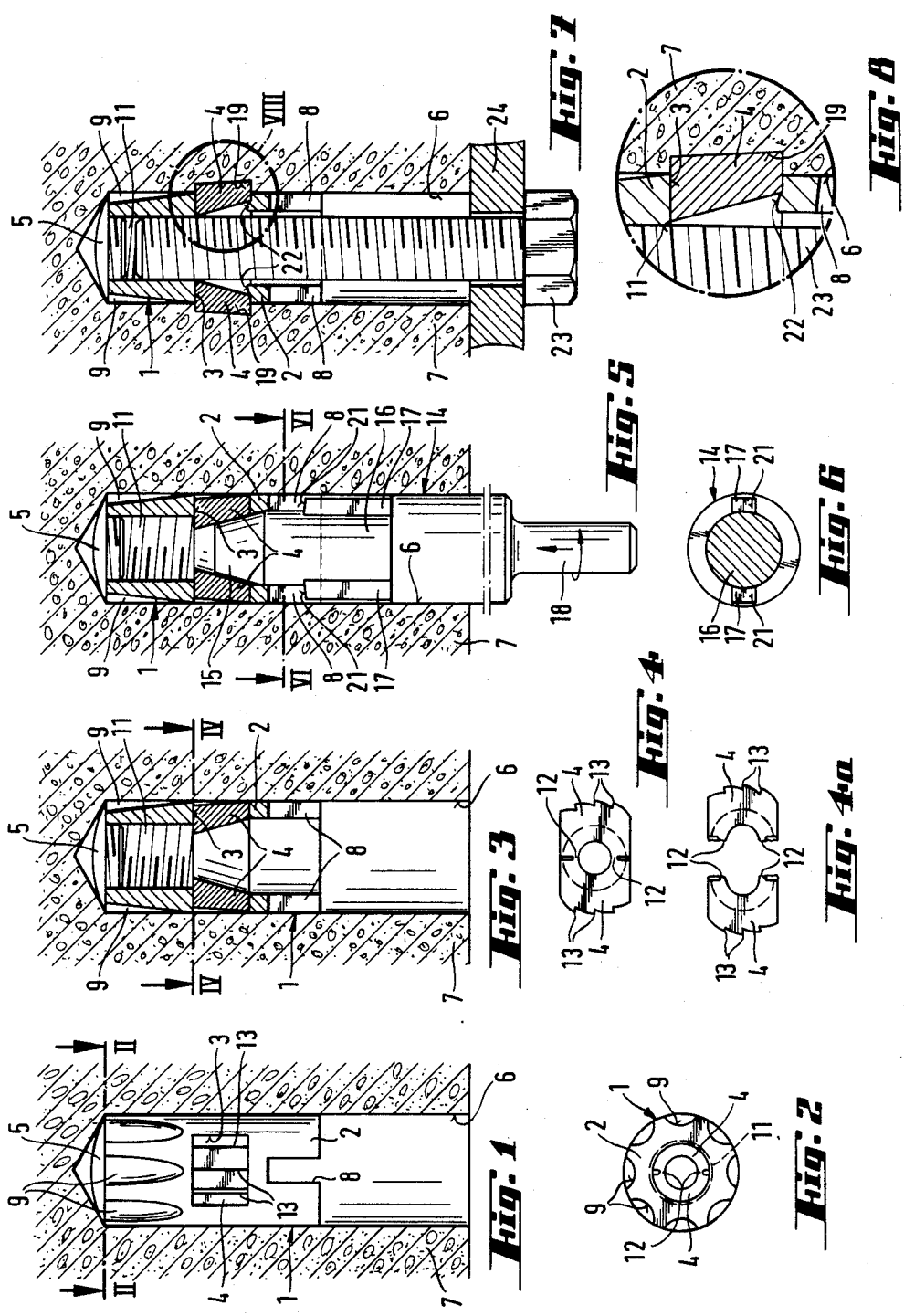

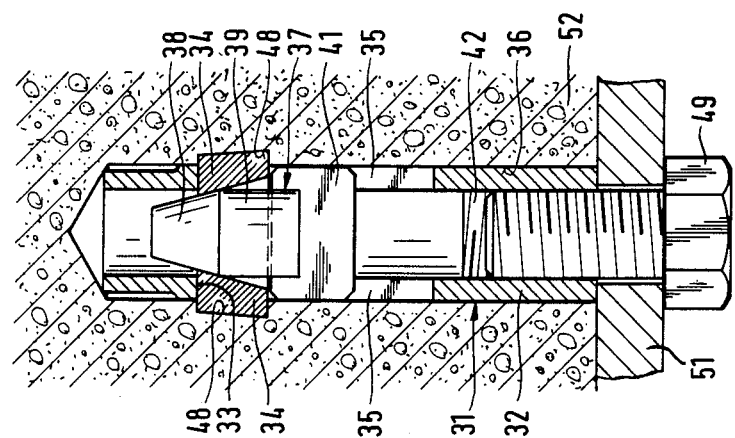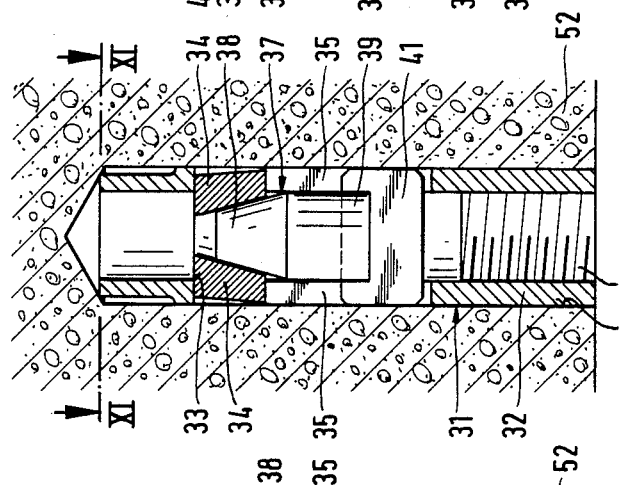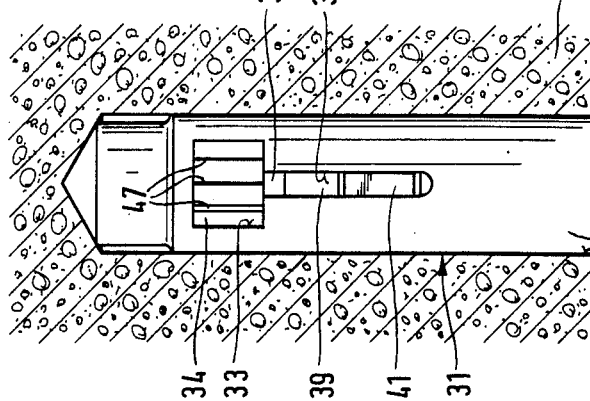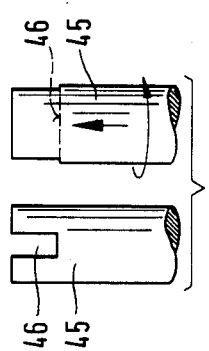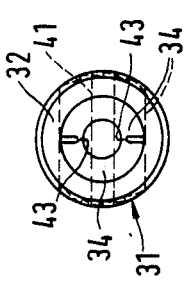

ANCHOR DOWEL ASSEMBLY

BACKGROUND OF THE INVENTION

The present invention is directed to an anchor dowel assembly with a sleeve containing window-like openings in which radially displaceable locking members are positioned so that initially the locking members project into the bore formed in the sleeve. The radial dimension of the locking members is greater than the thickness of the sleeve wall.

In the German Offenlegungsschrift No. 25 35 066 a known dowel is disclosed which is used exclusively in receiving bores with undercuts and the dowel includes locking members supported in window-like openings so that the members can be displaced radially outwardly into the undercut by an expansion member. To effect the radial displacement, the expansion member is rotated and runs in the insertion direction of the dowel into the borehole between the locking members because of a threaded connection. Due to experience with such a dowel, after it is introduced into the receiving bore in the dowel, it is freely rotatable. Accordingly, it is not possible to effect the radial displacement of the locking members to achieve an anchoring effect merely by rotating the expansion member, since the locking member and the sleeve would be rotated ineffectively along with the expansion member due to the threaded connection. To achieve the displacement of the locking members, the sleeve must be secured against rotation along with the expansion member and this requires appropriate auxiliary means engaging the sleeve and a complicated manipulation.

SUMMARY OF THE INVENTION

The primary object of the present invention is to provide an anchor dowel assembly where locking members are radially displaceable in a simple manner without requiring separate auxiliary means.

In the present invention, initially the locking members project inwardly into the bore formed by the inside surface of the sleeve so that the locking members cooperate with an expansion tool which can displace the locking members radially outwardly beyond the outside surface of the sleeve. The expansion tool can be driven by a force applied in the direction in which the sleeve is inserted into a prepared borehole.

Due to the axially directed force acting on the expansion tool, the tool passes between the locking members without the need for any special auxiliary means for holding the sleeve. Accordingly, a reliable radial displacement of the locking members in connection with a simple insertion procedure is assured. The locking members can be displaced radially into a prefabricated undercut in the receiving bore into which the sleeve is inserted.

The axially directed force can be applied to the expansion tool as a continuously applied pressure. It is appropriate to provide such force in the form of blows by means of known tools, such as a percussion drilling tool.

Preferably, the expansion tool has an axially extending conically shaped outer surface arranged to coact with the locking members in effecting the anchoring of the dowel. Due to the conically shaped outer surface, the expansion tool can be inserted into the sleeve in contact with the locking members in any rotational position. Initially, the expansion tool extends partially between the locking members or it is located behind the locking members in the direction in which the dowel is inserted into a borehole. The expansion tool may be in the form of a component which remains in the dowel or it may be removable from the dowel. If the expansion tool is a removable part, it must be possible to assure that the locking members remain in the radially outwardly displaced position to maintain the desired anchoring effect. Accordingly, the sleeve can be deformed in the region in which the locking members are displaced radially outwardly to assure that the locking members are maintained in the radially displaced position.

When the expansion tool has an axially extending conically shaped outside surface, the locking members are in a shell-like shape with a corresponding conically shaped inside surface to be contacted by the expansion tool. As a result, the force directed by the expansion tool against the locking members can be effected over an axially extending area for transmitting high compression forces to the locking members.

Preferably, the expansion tool is in relative nonrotatable connection with the sleeve because of guide means. This arrangement is particularly advantageous if the expansion tool has a wedge-shaped expansion region instead of a conically shaped expansion region. The wedge-shaped expansion region requires a defined rotational position with respect to the locking members and also with respect to the sleeve and such an arrangement is assured by the proposed relative non-rotational connection. If required, due to the relative non-rotational connection, it is possible to transmit rotation through the guide means to the locking members and to the sleeve.

In another embodiment of the present invention, the expansion tool can be formed of a first section with a conically shaped outer surface and a second axially trailing section incorporating the guide means. The expansion tool and the guide means can be formed as a unitary member or as separate parts.

If the expansion tool and the guide means are separate parts, the expansion tool can be formed as a part of the dowel assembly. Advantageously, the guide means may be formed as a plate forming a part of the second section and extending into slits in the sleeve. The driving member directing blows against the expansion tool may be in the form of a shaft acting upon the plate.

Where the expansion tool is formed as a unitary member, the guide means are designed as fins arranged as a trailing section of the tool with the fins extending into slits formed in the dowel sleeve. For reasons of cost, the expansion tool can be designed as a part separate from the dowel. Accordingly, the dowel is distinguished by a particularly simple construction. A relative non-rotatable connection between the expansion tool and the sleeve is effected by the engagement of the fins into slits into the sleeve. Where a unitary expansion tool is provided not as a part of the dowel, it can be formed, in part, as an insertion shank for a driving member or tool. The expansion tool thus remains clamped in the driving member when the tool is driven into the sleeve for the purposes of expanding the locking members and, subsequently, can be removed.

To achieve a uniform anchoring engagement in a receiving bore, locking members disposed diametrically opposite one another can be used. If only two locking members are employed, it is possible to provide a particularly simple and economical structure for the sleeve and locking members.

Another simple feature of the dowel is the interconnection of the locking members by breakable webs which separate when the locking members are driven radially outwardly. Accordingly, the dowel is anchored when the locking members are radially displaced through the sleeve opening. Moreover, with the webs interconnecting the locking members during the insertion of the dowel into a borehole, any premature displacement of the locking members is avoided.

Moreover, it is possible in accordance with the dowel of the present invention to produce the undercuts into which the locking members are secured in the prefabricated receiving borehole in the manner of a self-drilling dowel.

Accordingly, cutting edges are formed on the radially outer surfaces of the locking members. By rotating the dowel with the locking members along with the radially outward displacement of the locking members due to the action of the expansion tool and the driving device, the cutting edges on the locking members form an undercut as they rotate within the receiving bore. At the completion of the step of forming the undercuts, the locking members engage in a positive locking manner within the undercuts. The rotational movement of the expansion tool is effected by the interengagement of the guide means on the tool in the slits in the sleeve.

To apply or attach a load to the dowel sleeve, the bore within the sleeve can be provided with a thread. The thread can be located behind the locking members viewed in the insertion direction, however, preferably it is located ahead of the locking members.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of a dowel embodying the present invention inserted into a receiving borehole in a receiving material and before the locking members are displaced radially outwardly;

FIG. 2 is an end view of the dowel shown in FIG. 1 taken in the direction of the arrows located along the line II'II in FIG. 1;

FIG. 3 is an axially extending sectional view of the dowel illustrated in FIG. 1 and rotated through 90°;

FIG. 4 is a plan view of the locking members in the initial or unexpanded position taken in the direction of the arrows located along line IV—IV in FIG. 3;

FIG. 4a is a view similar to that in FIG. 4 but illustrating the locking members displaced radially outwardly;

FIG. 5 is a view similar to the axially extending sectional view in FIG. 3 with the addition of an expansion tool as arranged at the commencement of the expansion procedure;

FIG. 6 is a sectional view through the expansion tool along the line VI—VI in FIG. 5;

FIG. 7 is an axially extending sectional view similar to that shown in FIG. 5, however, with the locking members displaced radially outwardly and with a bolt securing an object to the receiving material in which the dowel assembly is inserted;

FIG. 8 an enlarged detail view of the section of the dowel encircled and defined by VIII in FIG. 7;

FIG. 9 is a view similar to FIG. 1 illustrating another embodiment of the present invention with the dowel assembly inserted into a receiving borehole;

FIG. 10 is an axially extending sectional view of the dowel assembly shown in FIG. 9 rotated through 90° and displaying the parts of the dowel assembly before the locking members are displaced radially outwardly;

FIG. 11 is an end view of the dowel assembly displayed in FIG. 10 and taken in the direction of the arrows along the line XI—XI in FIG. 10;

FIG. 12 are two partial axially extending views of a driving device shaft for connection to the expansion tool shown in FIG. 10 with the two views being offset by 90° relative to one another; and FIG. 13 is an axially extending sectional view of the dowel displayed in FIG. 10 with the locking members displaced radially outwardly and with a bolt securing an object to the dowel sleeve.

DETAILED DESCRIPTION OF THE INVENTION

In FIG. 1 an anchor dowel assembly 1 is formed of an axially extending sleeve 2 with locking members 4 supported to be radially outwardly displaceable through window-like openings 3 in the sleeve. The sleeve has a first end and a second end spaced apart in the axial direction with the first end inserted first into the borehole 6 in the receiving material 7 into which the dowel assembly is to be secured. A plug 5 is inserted into the first end of the sleeve 2 and prevents any small drill chips from entering into the interior of the sleeve 2. The receiving bore 6 is cylindrically shaped for receiving the dowel assembly in closely fitting engagement. As illustrated in FIG. 1, the sleeve 2 has axially extending slits 8 extending from its second end toward the first end. The slits terminate before reaching the window-like openings 3. Further, the slits extend through the sleeve wall. The outside surface of the sleeve adjacent the first end thereof is provided with a number of axially extending fluted portions 9 for receiving small drilling chips which may be produced in the dowel anchoring procedure. In FIG. 2 the location and arrangement of the fluted portions 9 can be noted.

The sectional view afforded by FIG. 3 further indicates the construction of the dowel assembly 1. The region of the interior of the dowel sleeve 2 extending from the first end has an internal thread 11 into which the plug 5 can be fitted. As can be seen in FIG. 3, the radial dimension or thickness of the locking members 4 is greater than the wall thickness of the sleeve 2. In other words, the maximum radial dimension of the locking member is greater than the radial dimension of the sleeve. The radially inner surface of the locking members is conically shaped with the inside surfaces converging toward the first end of the sleeve. Due to the difference in radial dimensions of the locking members and the sleeve wall, the locking members protrude into the bore formed within the sleeve 2 in the position as shown in FIG. 3, that is, before the locking members are radially displaced outwardly into the locking position.

As shown in FIG. 4, the diametrically opposed locking members 4 are connected to one another by a pair of webs 12 so that the two locking members form a single unit. When the locking members are expanded or displaced radially outwardly, the webs fracture because of their reduced thickness and the locking member can be displaced away from one another as is shown in FIG. 4a. The radially outer surfaces of the locking members 4 have saw-toothlike cutting edges 13, note FIGS. 4 and 4a.

To commence the anchoring procedure, an expansion tool 14 is inserted into the sleeve 2. The expansion tool extends in the axial direction of the sleeve and has a first axially extending section 15 defined by a conically shaped outer surface converging in the direction toward the first end of the sleeve.

Another axially extending section 16 extends from the trailing end of the first section 15 and is generally cylindrically shaped and has a pair of radially outwardly projecting fins 17 located opposite one another. The expansion tool has a shank portion 18 arranged to be secured into a driving device, such as a percussion drilling machine. The first section 15 of the expansion tool extends axially between the locking members 4 while the fins 17 extend into the slits 8 located in the trailing portion of the sleeve 2. The shape and location of the fins 17 on the second section 16 can be noted in FIG. 6.

Axially directed blows and rotational movement are directed to the expansion tool 14 via the shank 18 secured in a driving device, not shown, for purposes of simplicity, but indicated symbolically by the arrows on the shank 18 in FIG. 5. Due to the axially directed blows, the conically shaped first section 15 moves axially between the locking members 4 and displaces the locking members radially outwardly, note the initial positions of the locking members shown in FIGS. 3 and 5 and the expanded positions shown in FIGS. 7 and 8. The rotational movement is transmitted by the fins 17 through the slits 8 to the sleeve 2 of the dowel assembly 1. With such rotation, the locking members, as they are deflected radially outwardly, create by the cutting edges 13 an undercut section 19 in the receiving bore 6, note FIG. 7. After the complete insertion of the first section 15 between the locking members with the breakage of the webs 12, causing the locking members 4 to move in diametrically opposite directions, the free ends 21 of the fins 17 abut against the bottom or leading ends of the slits 8 and an indentation 22 is created in the sleeve 2 in the region of the inside surfaces of the window-like openings 3 at their trailing ends, that is, the surfaces of the window-like openings more remote from the first end of the sleeve 2. As a result, the indentations 22 retain the locking members 4 in the outwardly displaced position within the undercut 19. At this point, the expansion tool 14 can be withdrawn from the sleeve and a bolt 23 inserted into the sleeve to secure an object 24 to the surface of the receiving material 7. The dowel assembly 31 in FIG. 9 is similar to that in FIG. 1, however, its sleeve 32 extends for the full length of the borehole 36 in the receiving material 52. The sleeve 32 has window-like openings 33 in which locking members 34 are radially outwardly displaceably supported. The sides of the window-like openings 33 remote from the first end of the sleeve, that is, the leading end within the borehole, has axially extending slits 35 extending toward the second end or trailing end of the sleeve 32. The borehole 36 is cylindrically shaped to receive the dowel assembly 31 in closely fitting engagement. The dowel assembly can be anchored within the borehole 36.

As indicated in FIG. 10, the expansion tool 37 is located within the sleeve 32. The expansion tool 37 has an axially extending conically shaped first section 38 closer to the first or leading end of the sleeve 32 followed in the insertion direction by a cylindrically shaped second section 39 with a plate 41 loosely inserted into the trailing end of the second section and the plate forms a guide means. As shown in FIG. 10 in the initial position of the dowel assembly, inserted into the borehole 36 before the expansion procedure is commenced, first section 38 extends axially partially between the locking members 34. The plate 41 fits into slits 35 formed in the sleeve rearwardly of the window-like openings 33. Between the plate 41 and the second or trailing end of the sleeve 32, an internal thread 42 is provided within the sleeve.

In FIG. 11 the breakable webs 43 connect the locking members 34. During the expansion procedure the locking members 34 are driven away from one another effecting the breaking of the webs 43.

A shaft 45, illustrated in FIG. 12, has a slit 46 formed in its leading end which engages the plate 41 in driving the expansion tool 37. Rotation and an axially directed driving force is imparted to the plate 41 by the shaft 45 from a driving device or machine, not shown, which can impart percussion blows and rotation to the shaft 45 and through the shaft to the expansion tool 37. Accordingly, when the shaft 45 transmits both rotational and axially directed force against the expansion tool 37, the dowel assembly 31 is rotated and the first section 38 moves axially toward the first end of the sleeve 32 pressing the locking members 34 radially outwardly causing the webs to separate or break. The axially extending radially outer surface of the locking members are formed with cutting edges 47, note FIG. 9, similar to the cutting edges shown in FIG. 4, so that the rotation of the sleeve 32 and the locking members 34 causes an undercut to be developed in the receiving material into which the dowel assembly is placed. when the shaft 45 is removed at the end of expansion procedure, the expansion tool 37 remains in the sleeve and prevents any radially inward movement of the locking members toward the original position as shown in FIG. 10. With the shank 45 removed, a bolt 49 can be inserted into threaded engagement with the thread 42 within the sleeve for securing an object 51 to the outer surface of the receiving material 52.

While specific embodiments of the invention have been shown and described in detail to illustrate the application of the inventive principles, it will be understood that the invention may be embodied otherwise without departing from such principles.

I claim:

1. Anchor dowel assembly for insertion into a borehole formed in a receiving material comprising an axially elongated sleeve having a first end and a second end spaced apart in the axial direction thereof with the first end arranged to be inserted first into the borehole and said sleeve forming an axially extending bore located between the first and second ends thereof, said sleeve having an outside surface and a wall thickness extending between the surface forming the bore and the outside surface, a plurality of window-like openings formed through said sleeve and located between said first and second ends thereof, locking member mounted in said window-like openings formed through said sleeve and located between said first and second ends thereof, locking members mounted in said window-like openings and arranged to radially outwardly dispalceable from a first position where said locking members extend radially inwardly into the bore in said sleeve to a second position where the locking members extend radially outwardly from the outside surface of said sleeve, said locking members having a dimension in the radial direction thereof greater than the wall thickness of said sleeve, wherein the improvement comprises that said locking members each have a surface extending in the axial direction of said sleeve and located within the bore in said sleeve in the first position thereof, an expansion tool insertable into the bore of said sleeve from the second end thereof into engagement with the surface of said locking members within the bore in said sleeve for radially displacing said locking members outwardly through said window-like openings so that said locking members project radially outwardly from the outside surface of aid sleeve, said expansion tool arranged to receive a force for displacing said expansion tool at least in the direction toward the first end of said sleeve, said expansion tool is in interfitting engagement with said sleeve so that said expansion tool can be rotated and thereby otate said sleeve, the connection between said sleeve and said expansion tool comprises guide means mounted in said epxansion tool and engageable with said sleeve, said expansion tool comprises an axially extending first section located closer to the first end of said sleeve and an axially extending second section extending from said first section toward the second end of said sleeve, said first section having a conically shaped outside surface, and said second section including said guide means, said guide means comprises a plate having a pair of opposite flat surfaces extending in the axial direction of said sleeve with said plate fitted into said second section of said expansion tool, said sleeve having axially extending slits therein, and said plate being engageable within said slits in said sleeve.

2. Anchor dowel assembly, as set forth in claim 1, wherein said expansion tool includes a shank extending axially from the second section thereof in the direction out of the second end of the sleeve and said shank arranged to be secured in a driving device for transmitting rotational and axially directed movement to the first and second sections of said expansion tool.

3. Anchor dowel assembly, as set forth in claim 1, wherein breakable webs interconnect said locking members so that said webs break when said locking members are radially displaced outwardly from the first position into the second position.

4. Anchor dowel assembly, as set forth in claim 1, wherein said locking members have radially outwardly directed axially extending surfaces with axially extending cutting edges formed in said radially outer surfaces.

* * * * *